US011791763B1

(12) United States Patent
Laine et al.

(10) Patent No.: US 11,791,763 B1
(45) Date of Patent: Oct. 17, 2023

(54) RENEWABLE ENERGY GENERATING CLADDING

(71) Applicants: Zev Laine, Boca Raton, FL (US); Simon Arzouan, Boca Raton, FL (US)

(72) Inventors: Zev Laine, Boca Raton, FL (US); Simon Arzouan, Boca Raton, FL (US)

(*) Notice: Subject to any disclaimer, the term of this patent is extended or adjusted under 35 U.S.C. 154(b) by 0 days.

(21) Appl. No.: 18/188,291

(22) Filed: Mar. 22, 2023

(51) Int. Cl.
| | | |
|---|---|---|
| H02S 20/26 | (2014.01) | |
| H02S 40/36 | (2014.01) | |
| H02S 50/00 | (2014.01) | |
| H02S 40/34 | (2014.01) | |
| H02S 40/38 | (2014.01) | |

(52) U.S. Cl.
CPC .............. *H02S 20/26* (2014.12); *H02S 40/34* (2014.12); *H02S 40/36* (2014.12); *H02S 40/38* (2014.12); *H02S 50/00* (2013.01)

(58) Field of Classification Search
CPC ....................................................... H02S 20/26
See application file for complete search history.

(56) References Cited

U.S. PATENT DOCUMENTS

| | | | | |
|---|---|---|---|---|
| 7,592,537 | B1* | 9/2009 | West ........................ | F24S 25/61 |
| | | | | 136/251 |
| 10,914,067 | B2* | 2/2021 | Gilbertson ............ | E06B 3/4609 |
| 11,479,969 | B2* | 10/2022 | Claeys .................... | F24D 3/147 |
| 2006/0016133 | A1* | 1/2006 | Speck ...................... | E04B 2/90 |
| | | | | 52/79.1 |
| 2010/0071952 | A1* | 3/2010 | Brescia ................... | E04B 2/967 |
| | | | | 174/481 |
| 2012/0085042 | A1* | 4/2012 | Macdonald ......... | E04F 13/0826 |
| | | | | 52/302.1 |
| 2014/0157699 | A1* | 6/2014 | Moeller ................. | E04F 13/23 |
| | | | | 52/235 |
| 2014/0157718 | A1* | 6/2014 | Fournier .................. | E04B 2/90 |
| | | | | 52/707 |
| 2017/0040940 | A1* | 2/2017 | Ting ........................ | E04B 2/965 |
| 2019/0071863 | A1* | 3/2019 | Ting ...................... | E04B 1/4107 |
| 2022/0298786 | A1* | 9/2022 | Koh ........................ | F24F 3/001 |

FOREIGN PATENT DOCUMENTS

| | | | | | |
|---|---|---|---|---|---|
| CA | 2860242 | A1 * | 10/2014 | .............. | E04B 2/88 |
| CN | 102345350 | A  * | 2/2012 | ....... | H01L 31/02008 |
| CN | 103906882 | A  * | 7/2014 | | |
| CN | 103400880 | B  * | 3/2016 | | |
| CN | 107819424 | A  * | 3/2018 | | |

(Continued)

*Primary Examiner* — Babajide A Demuren
(74) *Attorney, Agent, or Firm* — Steven Rinehart

(57) ABSTRACT

The invention relates to renewable energy generation and, more particularly, to a cladding system that generates energy from renewable sources. The cladding system comprises, inter alia, a single and/or plurality of renewable energy generating units, such as solar panels, mounted on or integrated into a building's exterior cladding. The renewable energy generating unit(s) are connected to an energy storage system and/or the building's electrical grid, so that the energy generated by the unit(s) can be used to power the building or sold back to the Grid. The invention's features and purpose is to generate energy from a renewable source and allow usage of this energy to either power building resources (e.g. lighting, mechanicals, common areas etc.) and/or to sell the energy to the city grid.

13 Claims, 10 Drawing Sheets

(56) References Cited

FOREIGN PATENT DOCUMENTS

| | | | | | |
|---|---|---|---|---|---|
| CN | 112832428 | A | * | 5/2021 | ............... E04B 2/88 |
| CN | 114704012 | A | * | 7/2022 | |
| CN | 114753577 | A | * | 7/2022 | |
| EP | 2413446 | A2 | * | 2/2012 | ......... H01L 31/0488 |
| KR | 20090030134 | A | * | 3/2009 | |
| KR | 20100019742 | A | * | 2/2010 | |
| KR | 20110045522 | A | * | 5/2011 | |
| KR | 101063208 | B1 | * | 9/2011 | |
| KR | 20120114037 | A | * | 10/2012 | |
| KR | 1686991 | B1 | * | 12/2016 | ............. H02S 20/26 |
| KR | 20160139789 | A | * | 12/2016 | |
| KR | 20170101039 | A | * | 9/2017 | |
| KR | 1813068 | B1 | * | 12/2017 | .......... E04F 13/0828 |
| KR | 101813068 | B1 | * | 12/2017 | |
| KR | 2017142633 | A | * | 12/2017 | ............... E04D 1/30 |
| KR | 2020005766 | A | * | 1/2020 | ............. E04B 2/967 |
| KR | 20200005766 | A | * | 1/2020 | |
| KR | 102424882 | B1 | * | 7/2022 | |
| WO | WO-2005048356 | A1 | * | 5/2005 | .......... E04F 11/1851 |
| WO | WO-2006123335 | A2 | * | 11/2006 | ............. E04F 13/145 |
| WO | WO-2008114247 | A1 | * | 9/2008 | ............. F24J 2/0444 |

\* cited by examiner

RENEWABLE ENERGY GENERATING CLADDING

TECHNICAL FIELD

The present invention relates to useful technological embodiments of renewable energy and more particularly relates to various types cladding for a variety of useful, efficient novel purposes.

BACKGROUND

Heretofore, there have only been renewable energy sources plastered atop the cladding of roofs and edifices. This invention relates to renewable energy generation and, more particularly, to a cladding system that generates energy from renewable sources.

The integration of photovoltaic (or PV) devices and systems into commercial edifices has generally been confined to conventional roof-top based systems which have limited photovoltaic capacity and which have very small roof surface area relative to other external surface areas such as walls. As such, conventional PV systems cannot cover enough surface area with conventional technology to power either the building much less supply power to an external power grid. The roofs of commercial buildings are often dedicated to other devices, such as rooftop air conditioning units, helicopter landing pads, and the like. Additionally, other buildings may hide or shade roof-top surface area in large metropolitan areas.

Most attempts to remedy these problems, such as improved PV strut systems, have not provided solutions sufficient to be commercially viable. As PV devices become more sightly and lighter, new uses of PV system become feasible, however obstacles remain in arraying PV devices together, installing, sealing and mounting PV systems. It would be desirable to incorporate vertical façades into vertical surface areas of the building assemblies and there is a need in the art for the same.

SUMMARY

The invention relates to renewable energy generation and, more particularly, to a cladding system that generates energy from renewable sources. The cladding system comprises, inter alia, a single and/or plurality of renewable energy generating units, such as solar panels, mounted on or integrated into a building's exterior cladding. The renewable energy generating unit(s) are connected to an energy storage system and/or the building's electrical grid, so that the energy generated by the unit(s) can be used to power the building or sold back to the grid.

The system features an energy transforming module, a component which uses a renewable energy source to mechanically, electrically, chemically or biologically transform that source into energy that can be harvested. In many embodiments, the solar cells are the module. The emitting sun excites the cells where electrons break free in order to produce an electrical charge. Each solar cell is interconnected. The solar cells can be installed in a multitude of spaces. They can be installed on a small portion of the system or the entire system depending on the design.

In several embodiments, solar cells are installed on the spandrel section of the window. This positioning allows to maximize the design for solar cells to harness a maximum amount of energy while also permitting a clear view to people looking through the vision glass.

Many embodiments feature an Energy Collector and Distributor; the energy produced is collected and distributed by an electrical device. In many embodiments, his device is a power box. The power box collects the energy produced by the solar cells and transmits that energy through the wiring. Many embodiments feature a Distribution System: The distribution system is the means by which the energy harvested is distributed as designed and required. In many embodiments, the distribution system is Wiring. The wiring is used to carry and distribute the energy to the required source. Many embodiments feature System Interaction: When multiple cladding systems are installed, they interconnect in a daisy chain or in parallel. This interaction occurs at the windows interconnection.

A renewable energy generating cladding system is provided comprising at least one renewable energy generating unit integrated with a building's exterior cladding, wherein the energy unit is connected to the building's electrical grid, comprising: a renewable energy generating unit; a cladding system circumscribing a building, the cladding system comprising: a forward glass layer between 2 mm and 20 mm thick positioned in front of the renewable energy generating unit, the forward; a power box positioned in front of one of a mullion and a transom positioned behind the renewable energy generating unit; wiring interconnecting a plurality of renewable energy generating units; and an interconnection system.

The renewable energy generating unit may comprises at least one solar panel. A plurality of renewable energy generating units may be connected in one of series and parallel.

The renewable energy generating cladding system of claim 1, wherein the renewable energy generating unit is integrated into the building's exterior cladding.

The renewable energy generating unit may be integrated into the building's façade by virtue of a mounting system comprising a embed pocket in a slab, mullion, transoms, and an anchor.

The renewable energy generating unit may be mounted on a frame attached to the building's exterior.

The renewable energy generating cladding system may further comprise a monitoring system to track the amount of energy stored and discharged, wherein the monitoring system comprises sensors to measure energy generation and consumption, as well as optionally-executed algorithms to optimize the performance and efficiency of the renewable energy generating cladding system.

In various embodiments, the renewable energy generating cladding system further comprises safety features of discharge transfer and overload surge protection.

The renewable energy generating cladding system of claim 1, wherein the renewable energy generating units are resistant to weather, environmental conditions, high shifting winds, hail and extreme temperatures.

The renewable energy generating cladding system of claim 1, wherein the renewable energy generating unit system is modular, and therefore interchangeable, replaceable, replicable and expandable.

The renewable energy generating cladding system of claim 1, further comprising an optional remote-control monitoring and communication system, said system optionally connected to a cloud-based platform that provides real-time data on energy generation, consumption, and performance of the system.

The renewable energy generating cladding system of claim 1, wherein the system provides a return on investment within a reasonable timeframe, therefore eligible for government incentives, rebates, energy credits and corollary financial benefits.

A renewable energy generating cladding system comprising at least one renewable energy generating unit integrated with a building's exterior cladding, wherein the energy unit is connected to the building's electrical grid, comprising:
- a plurality of transparent photovoltaic cells;
- a cladding system, the cladding system comprising:
  - a forward glass layer positioned in front of one or more of the plurality of photovoltaic cells;
  - a power box positioned within of one of a mullion and a transom suspending the forward glass layer;
  - an aluminum anchor recessed into an embed pocket of a cement slab, the aluminum anchor affixed to framing comprising mullions and transoms;
- wiring interconnecting a plurality of renewable energy generating units, the wiring running longitudinally and positioning between photovoltaic cells;
- a plurality of windows interconnections adapted to connect the wiring.

The renewable energy generating cladding system of claim 13, further comprising a fin positioning forward of the cladding system, the fin defining a hollow interior recess, wherein the fin comprises a power box and windows interconnection for connecting wiring from the plurality of transparent photovoltaic cells.

The renewable energy generating cladding system of claim 13, wherein the system provides a return on investment within a reasonable timeframe, therefore eligible for government incentives, rebates, energy credits and corollary financial benefits.

A renewable energy generating cladding system comprising at least one renewable energy generating unit integrated with a building's exterior cladding, wherein the energy unit is connected to the building's electrical grid, comprising:
- a renewable energy generating unit;
- a cladding system circumscribing a top half of a building, the cladding system comprising:
  - a forward glass layer between 2 mm and 20 mm thick positioned in front of the renewable energy generating unit, wherein a recess is defined between the renewable energy generating unit and the forward glass layer of between 1 and 5 mm thick;
  - a power box positioned in front of one of a mullion and a transom positioned behind the renewable energy generating unit;
  - an aluminum anchor recessed into an embed pocket of a cement slab;
- wiring interconnecting a plurality of renewable energy generating units, the wiring positioning within the recess.

Many embodiments feature Power Storage Devices. These devices are used to store the energy harvested and are capable of distributing the energy when needed and commanded by a control module. The control module or system is optional, and can be used to monitor the health of the system and identify any breakage or loss of performance and indicate its source to help and ease maintenance. The control module is also used to distribute the energy harvested according to defined parameters to the required energy use devices.

The window system embodiment comprises the following components: ONE: Framing: The framing is usually made of aluminum but can also be made out of steel. PVC, wood and other materials, inside of this frame is where the wiring and interconnections are housed. Each frame is made of various profiles called mullions and transoms. Each profile has a male and female interconnection side. TWO: Vision glass: Vision glass is the portion of glass that is used in a building from which we see clearly through. THREE: Spandrel glass is glass that is heavily tinted and opaque typically used to block view from the outside to the inside.

BRIEF DESCRIPTION OF THE DRAWINGS

FIG. 1 features the window system embodiment's Spandrel Area and Vision Bottom Area, consistent with various embodiments. FIG. 1 further features the embodiment's wiring, power box, window mullion, insulation, windows interconnection, solar cell, spandrel glass and vision glass, consistent with various embodiments.

FIG. 7 further illustrates the positioning and design of the windows interconnection.

FIG. 7 illustrates an environmental perspective view of renewable energy generating cladding in accordance with present invention.

DEFINITIONS

Figure 1:
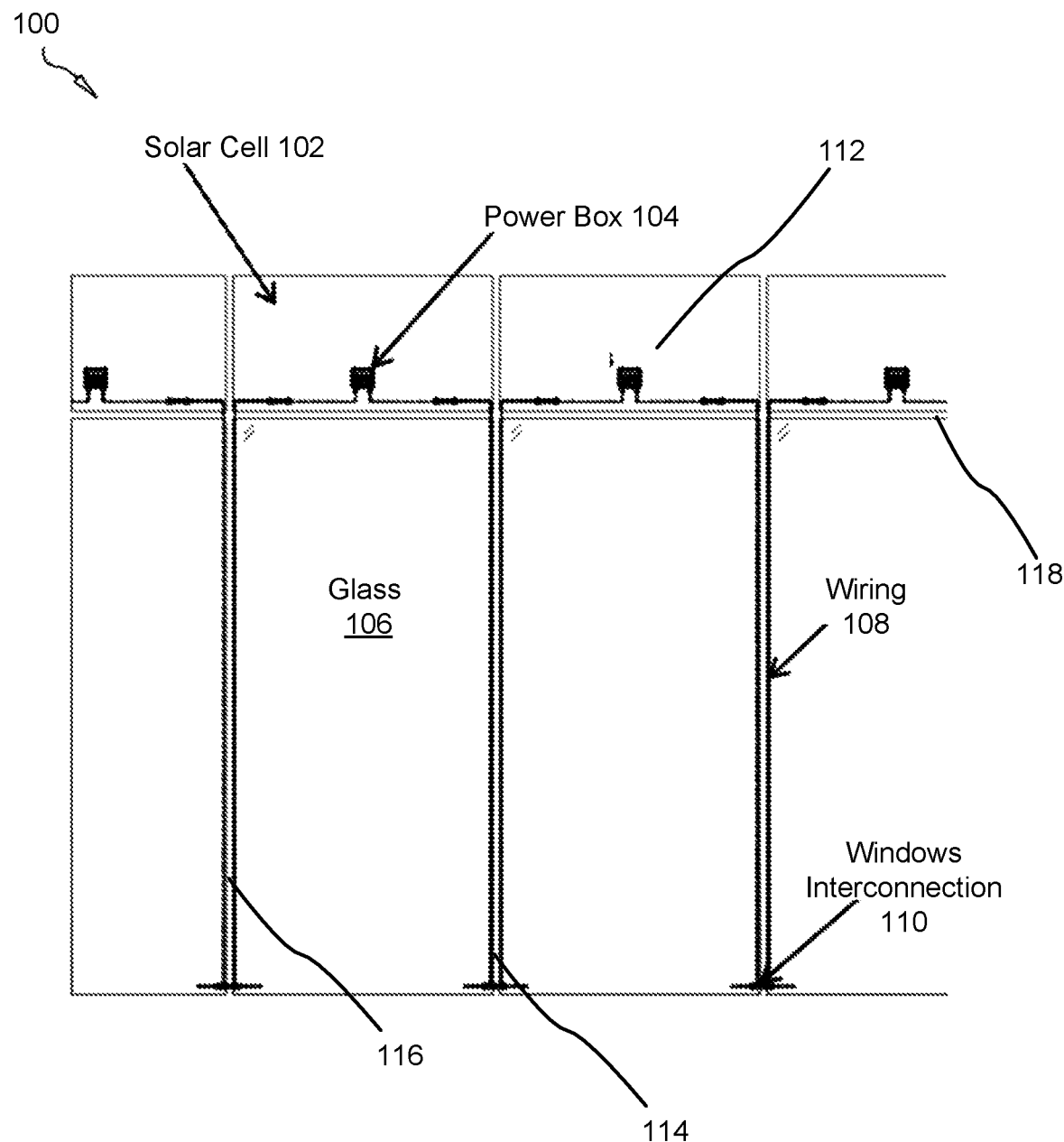
FIG. 1 depicts an embodiment of the renewable energy cladding system's primary components and interconnections when designed and used in the invention's window system embodiment, consistent with various embodiments.

Photovoltaic glass ("PV Glass"): PV Glass incorporates transparent semiconductor-based photovoltaic cells, which are also known as solar cells. PV Glass utilizes solar cells to convert solar energy into electricity. In the present invention, PV Glass is installed as, into or onto, areas of, inter alia, a building to produce power for an entire building or structure.

IGU: Insulated glass units ("IGUs") prevent heat loss through glass facades, partitions, doors and windows.

PV Glass Interlayer: The interlayer in the glass composition consisting of PV solar cells.

Junction Box: An electrical enclosure where an electrical connection is made between 2 components.

Spandrel Glazing: Glass with feature preventing view from outdoor to indoor.

[Aluminum] Transmission Mullion: Component of the window frame

PV Glass Wire: Electrical wiring used for power distribution to transmit electricity from renewable energy source or other source to a building outlet.

Embedded Channel: Channel system within the frame used to hold the system wiring interconnection system.

Spandrel Glass: Spandrel Glass: spandrel glass is, inter alia a vision application designed to be somewhat opaque in order to help obscure the spaces between the floors of a building, including insulation, vents, wires, slab ends and mechanical equipment.

Vision Glazing: Clear vision glass allowing through viewing from all sides. Windows Interconnection: system interaction points, often housed in the system's framing, linked in daisy chain or in parallel, optionally connected to a municipal electrical grid and/or to power storage devices.

DETAILED DESCRIPTION OF THE DRAWINGS

The renewable energy generating cladding system includes a single and/or plurality of renewable energy generating unit(s), which may be solar panels, or any other suitable renewable energy generating device. The unit(s) are mounted on or integrated into the building's exterior cladding, such as walls, or windows.

In one embodiment, the renewable energy generating units are mounted inside a frame that is attached to the building's exterior. The frame may be made of any suitable material, such as metal, plastic, or composite materials. The renewable energy generating units may be mounted on the frame using any suitable mounting system, such as clamps, brackets, or adhesive.

In another embodiment, the renewable energy generating units are integrated into the building's exterior cladding. For example, solar panels may be integrated into the building's walls, while wind turbines may be integrated into the building's windows.

The renewable energy generating units are connected to an energy storage system and/or the building's electrical grid, so that the energy generated by the units can be used to power the building or sold back to the grid. The energy storage system may include batteries, capacitors, or any other suitable energy storage or distributing device.

In some embodiments, the renewable energy generating cladding system may also include a control system that monitors and controls the operation of the renewable energy generating units and the energy storage system. The control system may be connected to the building's electrical system or may be a standalone system.

For clarity, renewable energy generating cladding includes all different types of exterior layer or skin of a building that helps to protect the interior from the elements and/or also contributing to its overall aesthetic appearance partially or fully fitted with materials capable of generating renewable energy including but not limited to all types of:
Brick cladding
Stone cladding
Metal cladding
Glass cladding
Wood cladding
Composite cladding
Concrete cladding
Terracotta cladding
GFRC cladding
Stucco cladding
Window systems

DETAILED DESCRIPTION OF ILLUSTRATIVE EMBODIMENTS

FIG. 1 depicts an embodiment of the renewable energy cladding system's 100 primary components and interconnections when designed and used in a window system. In FIG. 1, solar energy is the renewable energy source which the system harnesses and distributes using renewable energy generating units.

FIG. 1 illustrates an energy transforming module, the component that uses a renewable energy source to mechanically, electrically, chemically or biologically transform that source into energy that can be harvested. In FIG. 1, the solar cells 102 are the module. As shown in FIG. 1, solar cells 102 are installed only on a portion of the system (not plastered over the whole system). In FIG. 1, the solar cells 102 are installed on the spandrel section 112 of the window. This positioning allows the solar cells 102 to harness maximum available energy while permitting a clear view through the vision glass 106.

FIG. 1's window system comprises the following further seminal components. One component shown is the framing 114; the framing 114 is herein made of aluminum but can also be made out of steel, PVC, wood and other materials. Inside this frame 114 is where the wiring 108 and interconnections are housed. Each frame 114 is made of various profiles/components called mullions 116 and transoms 118. Each profile has a male and female interconnection side.

Another FIG. 1 component shown is the embodiment's vision glass 106; vision glass 106 is the portion of glass used in the building that allows an occupant to clearly see out. FIG. 1 features spandrel glass 112, glass that is heavily tinted and opaque, typically used to block view from the outside to the inside.

FIG. 1 also features the system's embodiment's energy collector and distributor. The energy produced is collected and distributed by an electrical device. This device in FIG. 1 is the power box 104. The power box 104 collects the energy produced by the solar cells 102 and transmits that energy through the wiring 108.

The power box 104 is always hidden by being positioned right in front of the transom 118 or just underneath the transom 118. In still further embodiments, the power box is positioned in front of the mullion 116 or alongside the mullion 116.

FIG. 1 also illustrates the invention's embodiment's distribution system, the means by which the energy harvested is distributed as designed and required. In FIG. 1, the distribution system is the wiring 108. The wiring 108 is used to carry and distribute the energy to the required source/destination.

FIG. 1 also illustrates the invention's embodiment's System Interaction when multiple cladding systems are installed they interconnect in a daisy chain or in parallel. In FIG. 1, the interaction is accomplished at the windows interconnection. (A second and final interconnection is the interconnection to the municipal electrical grid and/or to power storage devices, not shown in FIG. 1).

FIG. 1 further illustrates the system's embodiment's Power Storage Devices. These devices are used to store the energy harvested and are capable of distributing the energy when needed and commanded by a control module.

FIG. 1 further illustrates the system's Control Module. The control module or system is optional. The module can be used to monitor the health of the system and identify any breakage or loss of performance and indicate its source to help and ease maintenance. The control module is also used to distribute the energy harvested according to defined parameters to the required energy use devices.

Figure 2:
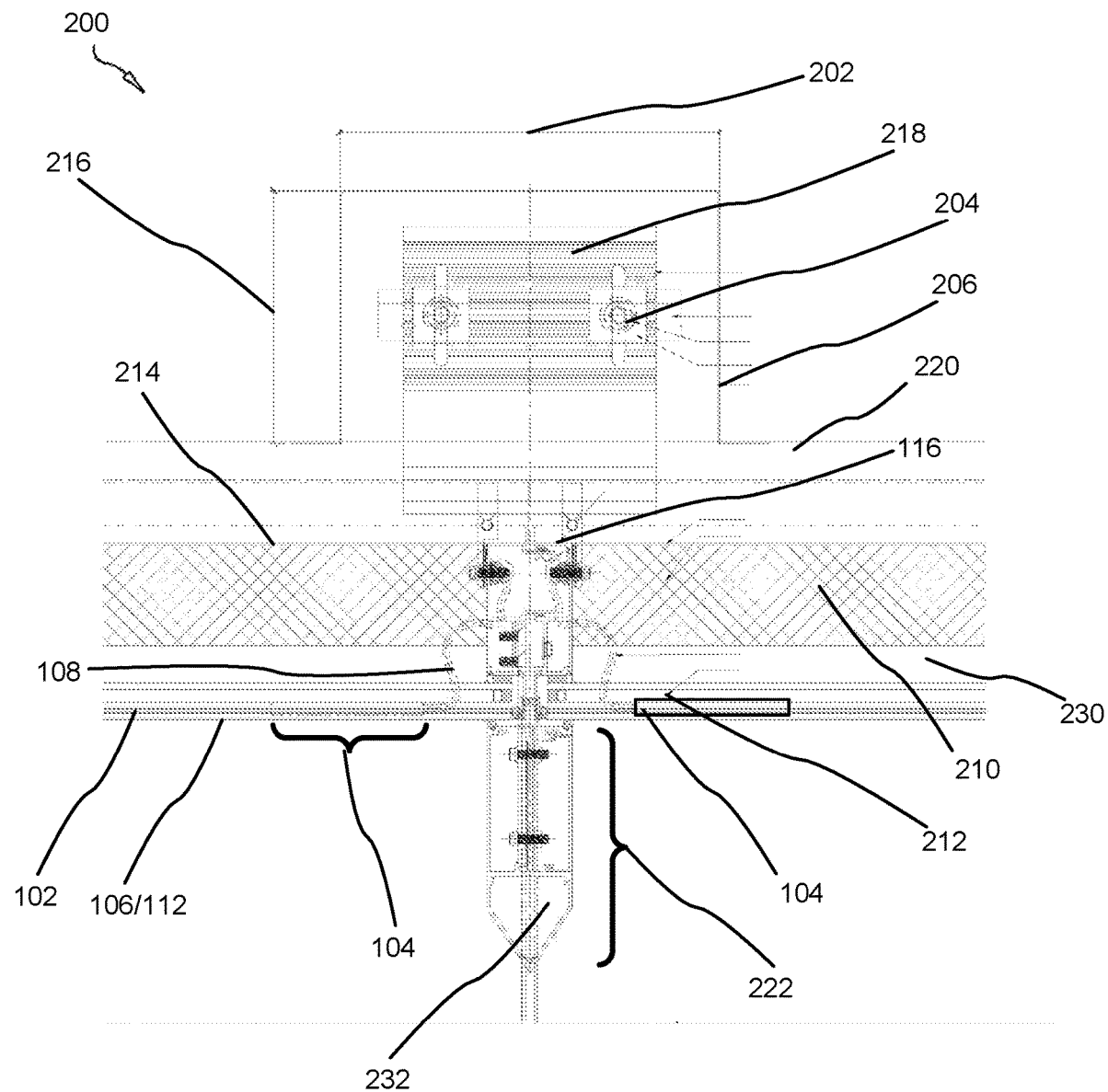
FIG. 2 is a structural technical drawing of the system's Spandrel Vision Glass embodiment, consistent with various embodiments.

FIG. 2 is a structural technical drawing of, inter alia, the system's spandrel vision glass embodiment 200, consistent with various embodiments. FIG. 2 features the system wiring, the system's glass composition as used in various embodiments, and PV Glass Interlayer. The Figure also features a channel for interconnection and a vertical mullion for structure. FIG. 2 also illustrates the function and positioning of the system's typical glass composition with PV Glass Interlayer.

The system 200 comprises a pocket width 202, a pocket height 216, an aluminum erection anchor 218, a steel t-bolt 204, a steel embed pocket 206, vertical mullion 118, semi rigid insulation 210, a glass interlayer 212, and wiring 108. The system comprises a painted aluminum interior sill cover 220 and a fin 222.

The fin 222 comprises a metal alloy or polymeric feature which juts forward of the glass 106. The fix 222 may cover gaps between cladding 200. In various embodiments, one or more of the power boxes 104 and the windows interconnection 110 may be housed within the fin 222. The fin 222 may taper or be frustoconical in shape. The fin 222 may define a hollow interior recess 232 into which a power box 104, the windows interconnection 110, and a plurality of wiring 108 may be housed.

Semi-rigid insulation 210 may position behind the glass 106 and PV glass 102 between mullion 116. In various embodiments, the semi-rigid insulation 210 is as thick as the mullion 116. A recess 230 be defined between the insulation 210 and the back pan of the cladding.

In various embodiments, the power box 104 is recessed into one or more of the glass interlayer 212, the solar panel 102, and the glass 106. The power box 104 may position behind one or more of the glass 106 and the PV glass 102.

Figure 3A:
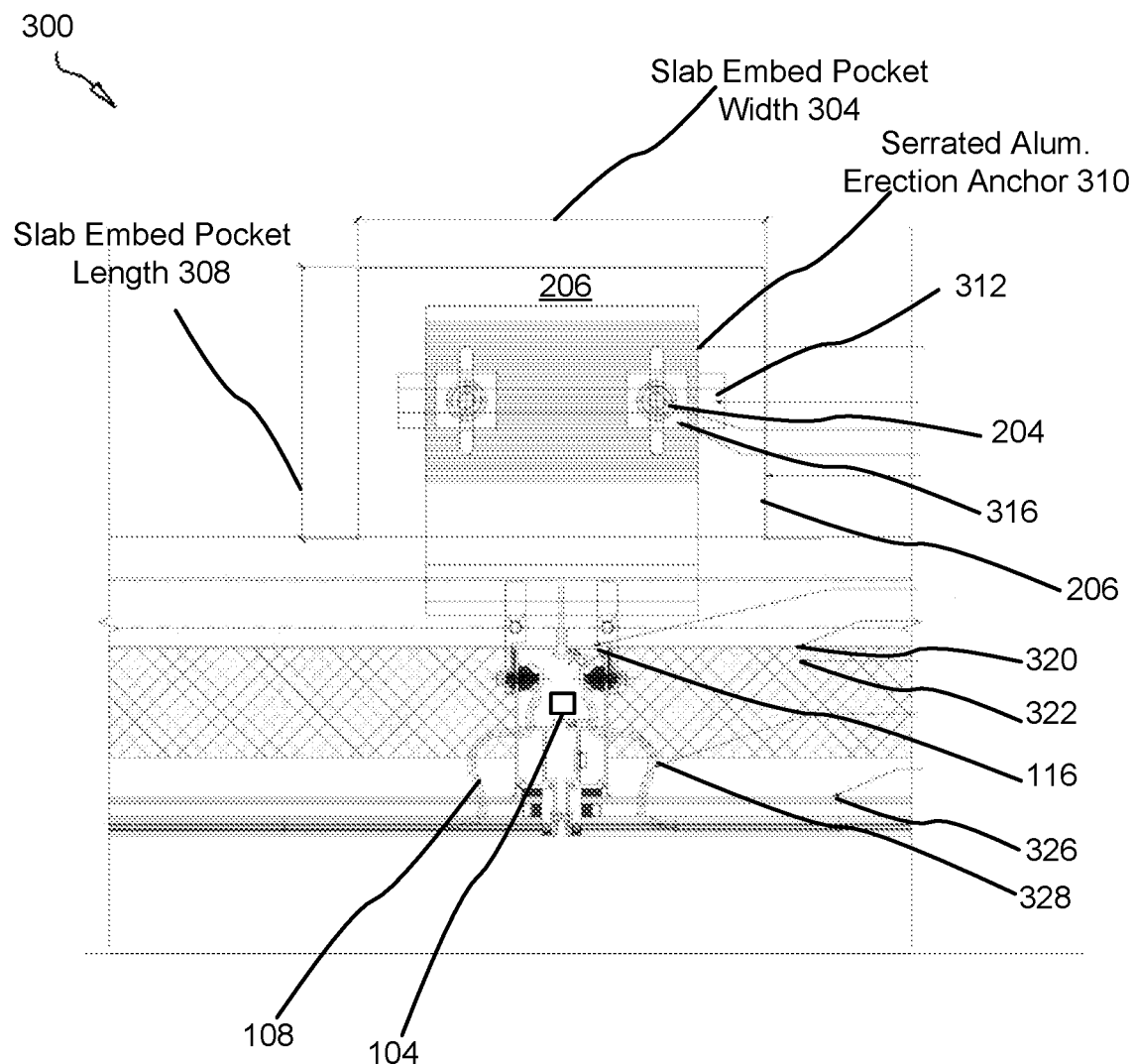
FIG. 3A depicts the system's structural technical drawing of Spandrel Plan and Section Stack Joint, consistent with various embodiments, featuring system wiring and PV Glass Interlayer.

FIG. 3A depicts the system's structural technical drawing of Spandrel Plan and Section Stack Joint, consistent with various embodiments. FIG. 3A features wiring 108 comprising PV glass wire 328 interconnected the PV glass and the junction box; spandrel IGU with PV glass interlayer 326; aluminum vertical mullion 116; semi-rigid insulation; a galvanized back pan 320; a galvanized steel embed pocket 206; a serrated washer plate 316; a t-bolt 204; a steel embed channel 312; a serrated aluminum erection anchor 310; and a slab embed pocket length 308.

Figure 3B:
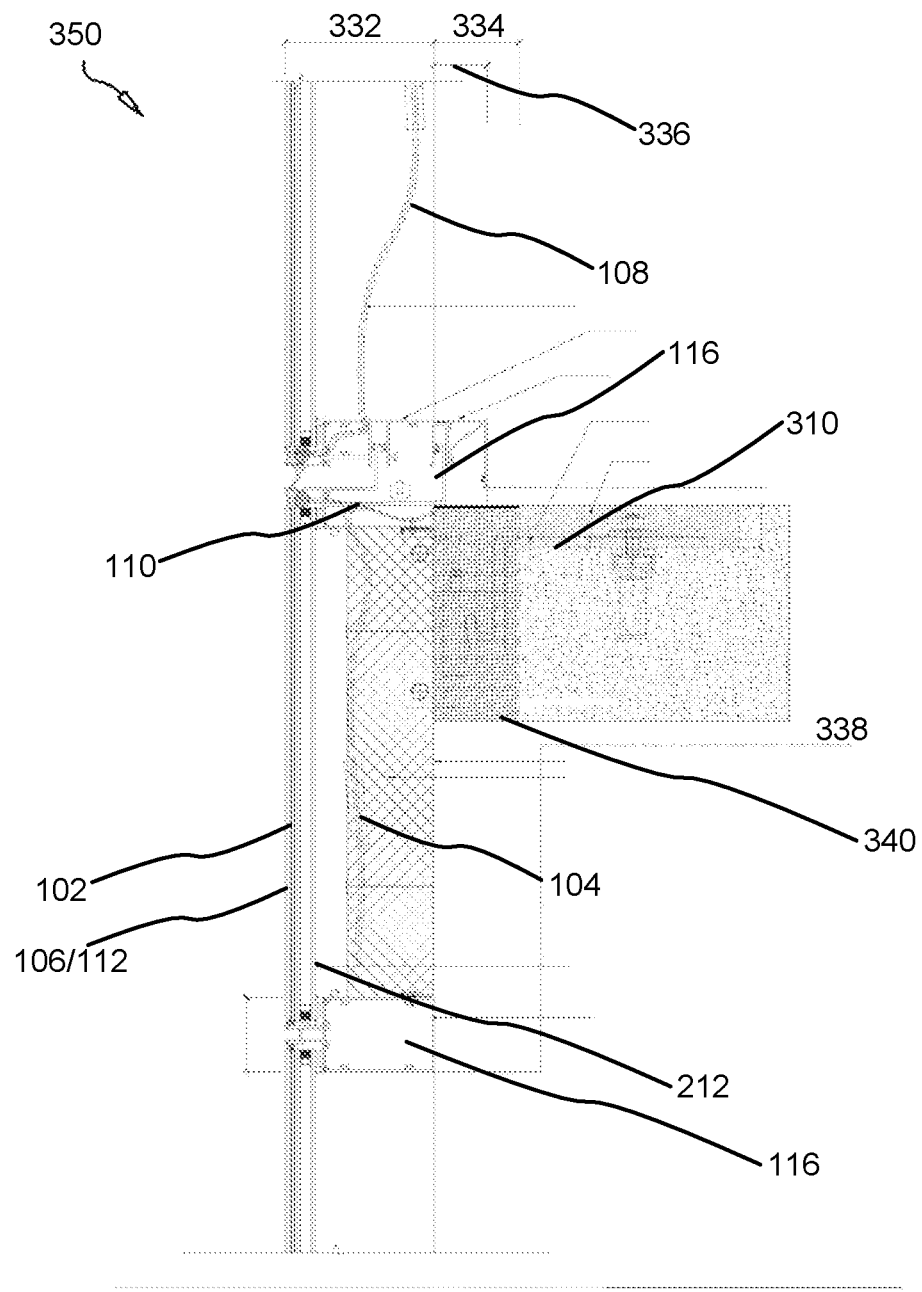
FIG. 3B depicts the system's structural technical drawing of Spandrel Plan and Section Stack Joint, consistent with various embodiments, featuring system wiring and PV Glass Interlayer.

FIG. 3B depicts the system's 350 structural technical drawing of Spandrel Plan and Section Stack Joint (i.e., renewable energy generating cladding), consistent with various embodiments. FIG. 3B features a system depth 332, a slab edge gap 334, a sill cover 336, wiring 108, glass 106, a photovoltaic cell 102, a power box 104, a windows interconnection 110, a glass interlayer 212, a mullion 116, a finish floor 338, and a fire safing 340.

Figure 4:
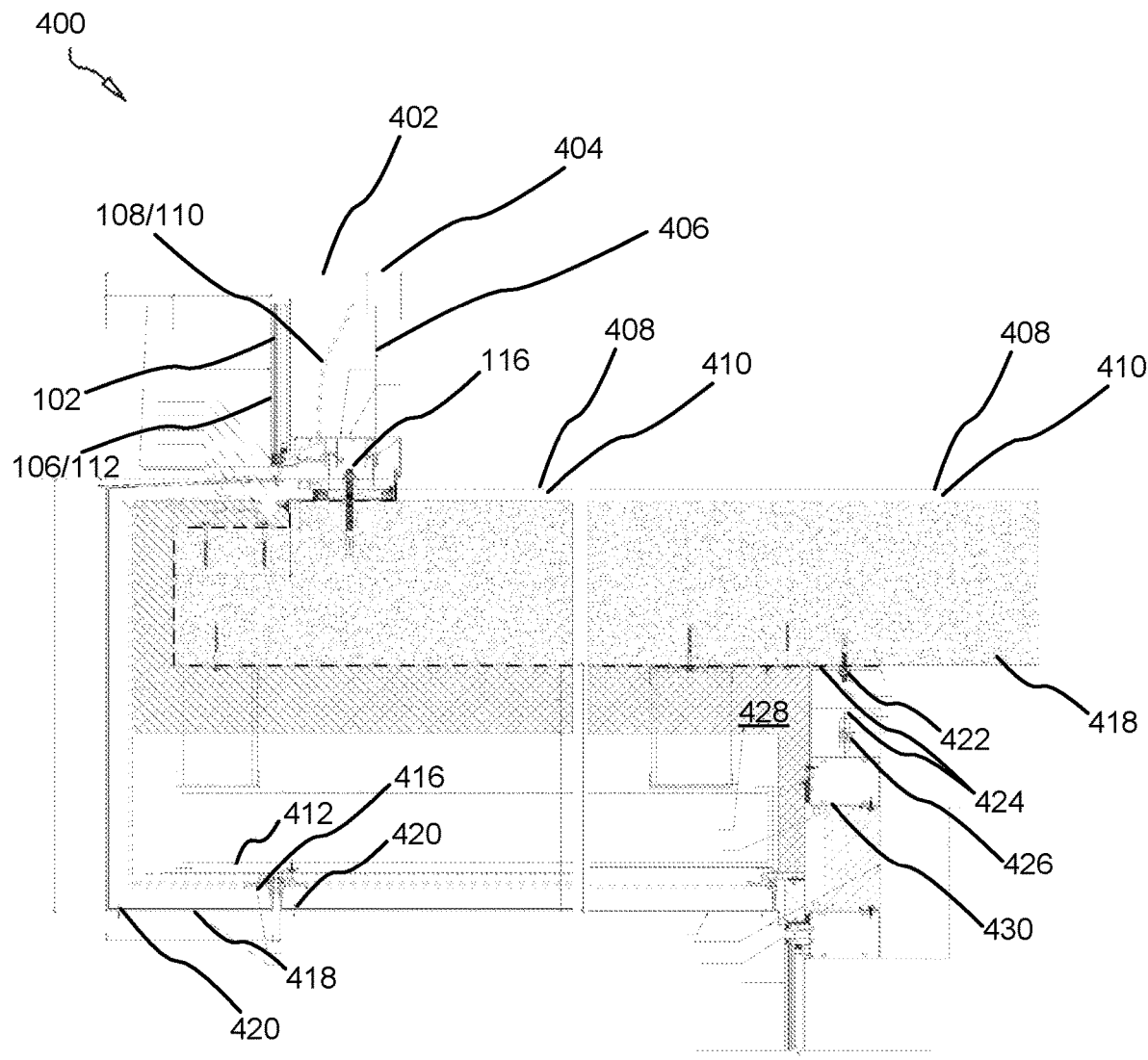
FIG. 4 depicts the system's structural technical drawing o CW Spandrel Glass, consistent with various embodiments.

FIG. 4 depicts an environmental perspective view of Spandrel Plan and Section Stack Joint, consistent with various embodiments. FIG. 4 features the system wiring 108, the system's glass composition as used in various embodiments including a solar panel 102 disposed behind, and PV Glass Interlayer, and typical insulation.

The system 400 further comprises a weep hole 420, a pre-finished aluminum composite panel 418, stud framing 412, an aluminum clip 416, a finish floor 408, a subfloor 410, five-inch thick insulation 428, aluminum horizontal mullion 430, an anchor screw 422, a bolt and nut 426, and an anchor plate 424.

The semi-rigid insulation may be four inches thick or vary in thickness from inch to eight inches. The wash plate 316 may be fabricated from aluminum and may be serrated.

Figure 5:
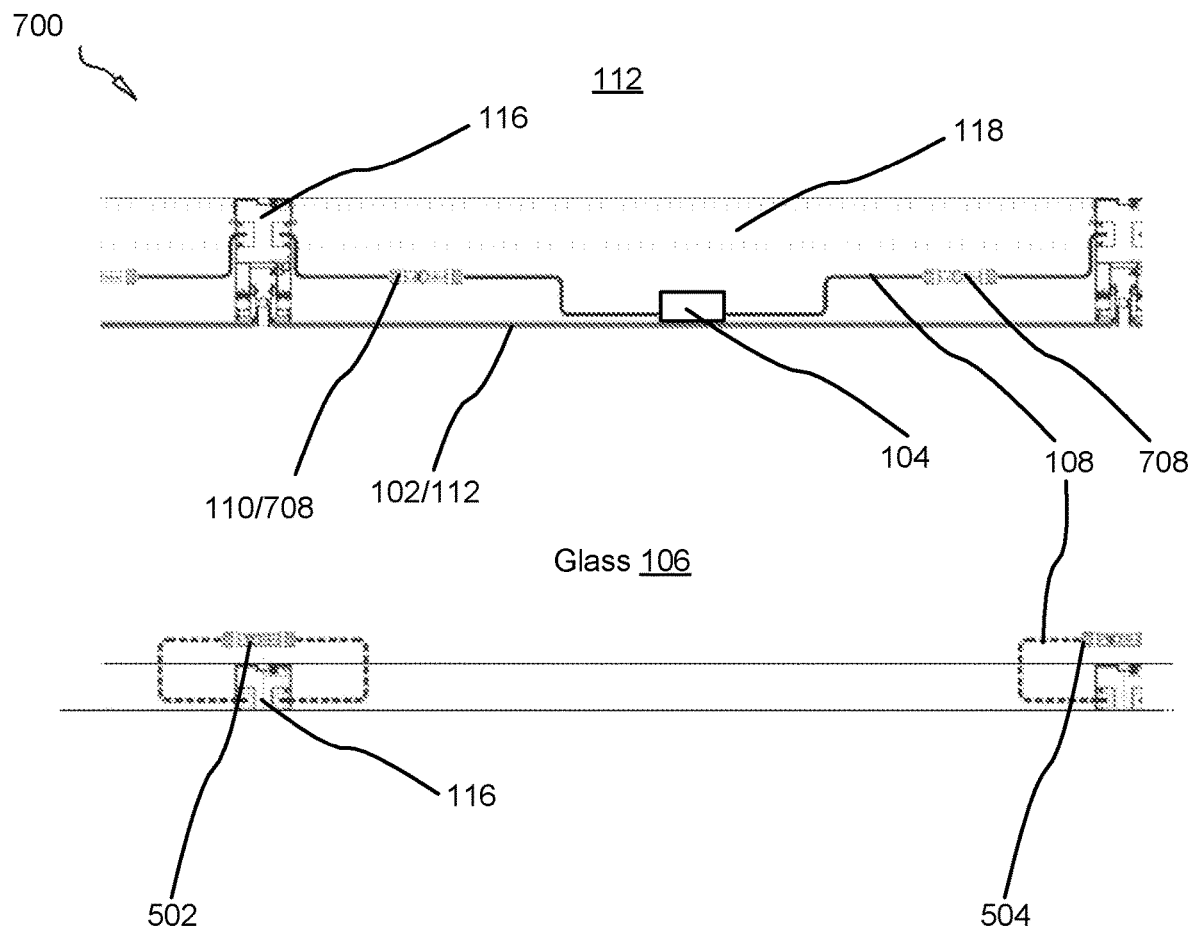
FIG. 5 illustrates the invention's window system embodiment, illustrating the Spandrel Area and Vision Bottom Area, consistent with various embodiments.

FIG. 5 depicts a renewable energy generating cladding 500 in accordance with the present invention. The cladding 500 comprises a mullion 116, a spandrel section 112, a power box 104, wiring 108, glass 106, a windows interconnection 110, and a solar panel 102.

The windows interconnection 110, in various embodiments, comprises a threaded cylindrical body 502 adapted to mate with two or more threaded connectors 504.

In various embodiments, the glass 106, in various embodiments, comprises, or is adhered to or abuts, one or more photovoltaic cells 102. The glass 106 may be is placed in front of the photovoltaic cell 102 such that the photovoltaic cells 106 is spaced behind the glass 102. The glass 106 may comprise silica glass and/or acrylic and may be adhered to the photovoltaic cell 102 or in front or a plurality of photovoltaic cells 102.

In various embodiments, a small recess of 1-2 mm is defined between the glass 106 and the PV glass 102, such that the PV glass 102 and the glass 106 are spaced apart slightly. In various embodiments, the glass 106 is arcuate, concave or convex to some degree such that the glass 106 acts as a concentrator focusing light on photoactive layers of the PV glass 102. In some embodiments, only a portion of the glass 106 is curved forming a lens in front of photoactive areas of the glass 102. The glass 106 may be coated with anti-reflected coating.

The glass 106 may be formed from a plurality of silica-based chemically-tempered or heat-tempered glass sheets or annealed silica glass or nylon, which may be cut to a predimensioned form or formed within a mold or tool, and dyed to form a certain color, such as with cobalt to form blue. In various embodiments, the glass 106 layered in front of the photovoltaic cell is thin to allow maximum light and UV light to penetrate, being from 1 mm to 10 mm. In other embodiments, the glass 106 comprises a simple flexible, laminated substrate. A laminated substrate may dispose between the glass 106 and the PV glass 102.

In various embodiments, the wiring 108 traversing either the glass 106 and/or the PV glass/cell 102 internally. The wiring may traverse internal channels formed when the glass 106 is fabricated using means known to those of skill in the art or may be traverse a small recess between the PV glass 102 and the glass 106. The photoactive layers may be integrated into the glass 102

Figure 6A:
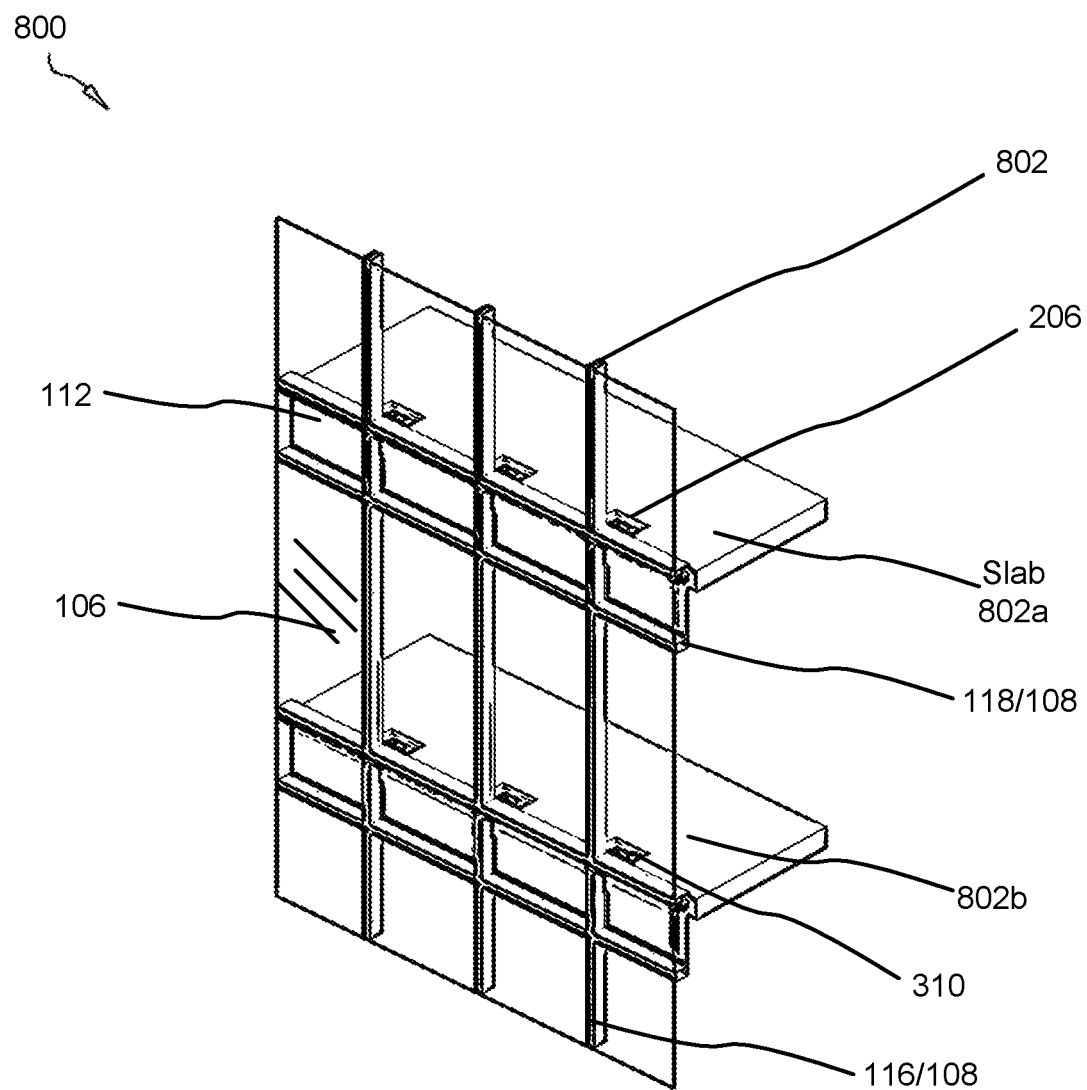
FIG. 6A depicts external perspective views of the system's windows embodiment, featuring the system's positioning of CW Spandrel Glass.
Figure 6B:
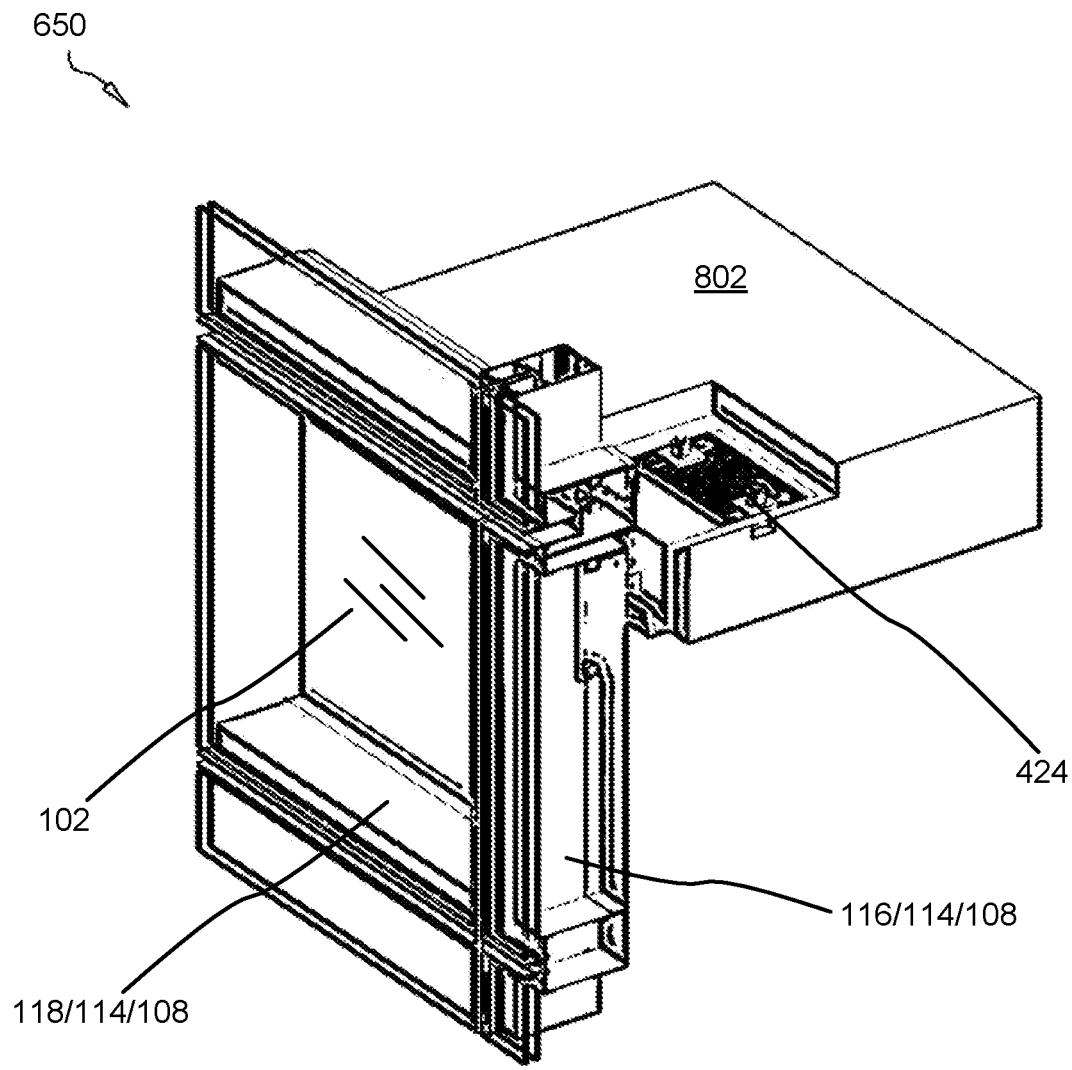
FIG. 6B depicts external perspective views of the system's windows embodiment, featuring the system's positioning of CW Spandrel Glass.

FIGS. 6A-6B illustrate the invention's window system 600-650 embodiment, illustrating the Spandrel Area and Vision Bottom Area, consistent with various embodiments. The system 600 comprises a forward glass 106 pane disposed in front of transparent PV glass 102. The slabs 802a-b, which form part of a building structure and which may be fabricated from concrete, define an embed pocket 206 into which the an anchor 310 and/or plate 424 and/or bolt and nut 426 inserts. In various embodiments, the embed pocket 206 and the anchor 310 may be rectangular from an upper perspective and may be from six inches to 16 inches wide and from 5 inches to 15 inches deep.

The framing 114 is suspended from the anchor 310, including hollow mullion 116 and transom 118. The mullion 116 and the transom 118 form a hollow interior recess 802 through which the wiring 108 may traverse. In various embodiments, the power box 104 is also housed within the hollow interior recess 108. In some embodiments, a plurality of power boxes 104 are spaced together horizontally within a transom 118 or vertically within mullion 116 to provide more convenient repair access to multiple power boxes 104.

The PV glass 102 may be fabricated on a glass substrate with the electrical connection created at fabrication (i.e., monolithic integration).

The power box 104 may comprises bypass diodes, wiring, and other components necessary to prevent power from feeding back to the PV glass 102. In some embodiments, the power boxes 104 comprises inverters. In other embodiments, the power boxes 104 feed power to inverters in separate areas of the building.

Figure 7:
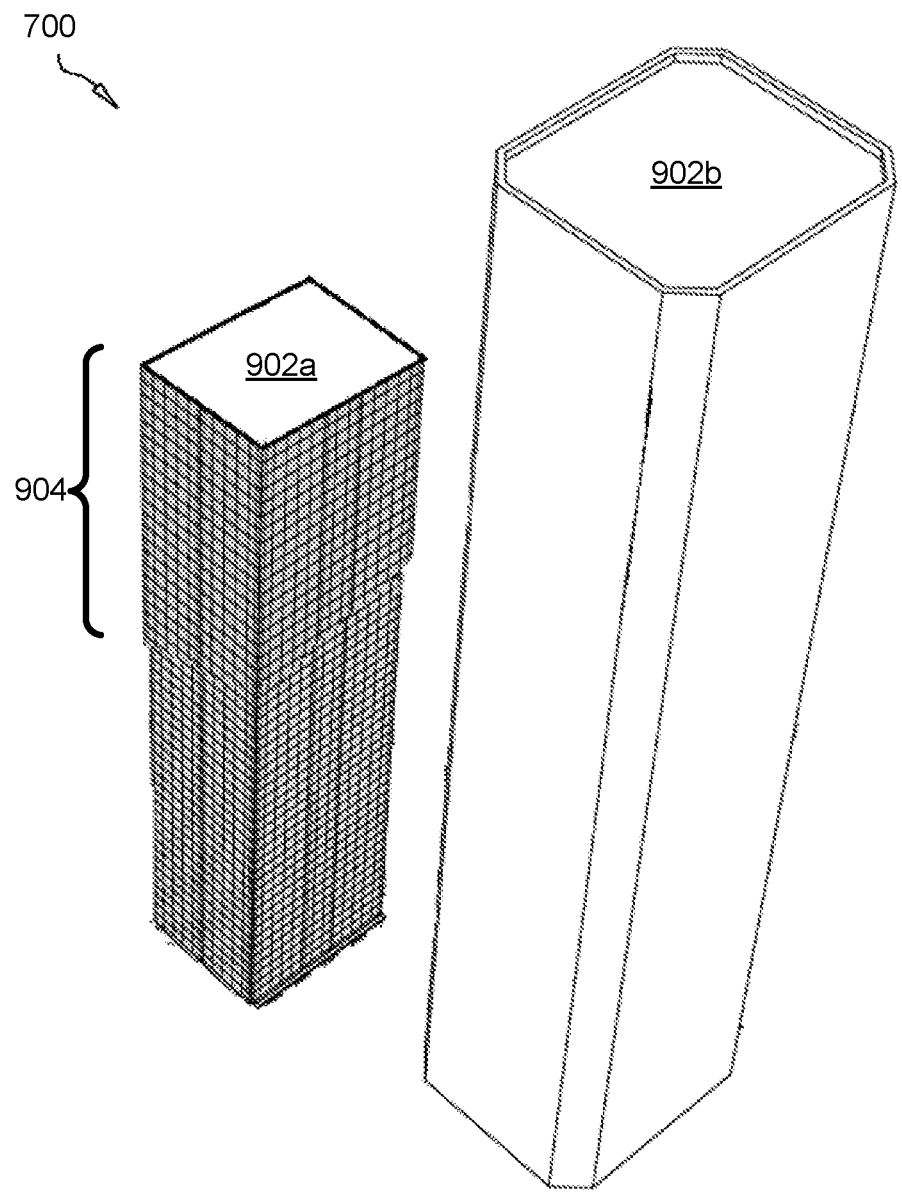
FIG. 7 features the embodiment's wiring, power box, PV Glass Interlayer.

FIG. 7 illustrates an environmental perspective view of renewable energy generating cladding 700 in accordance with present invention.

The cladding 700, in the shown embodiment, may be affixed to a building 902.

In some embodiments, only the upper half, third, fourth or fifth of a building integrates into its construction the renewable energy generating cladding 700 as in various embodiments, only this portion of the building is sufficiently exposed to sunlight. Additionally, with tall buildings such a skyscrapers, temperatures are colder at the top of the building than the bottom near a ground surface, resulting in increased efficiency of the system 100, 700.

Figure 8:
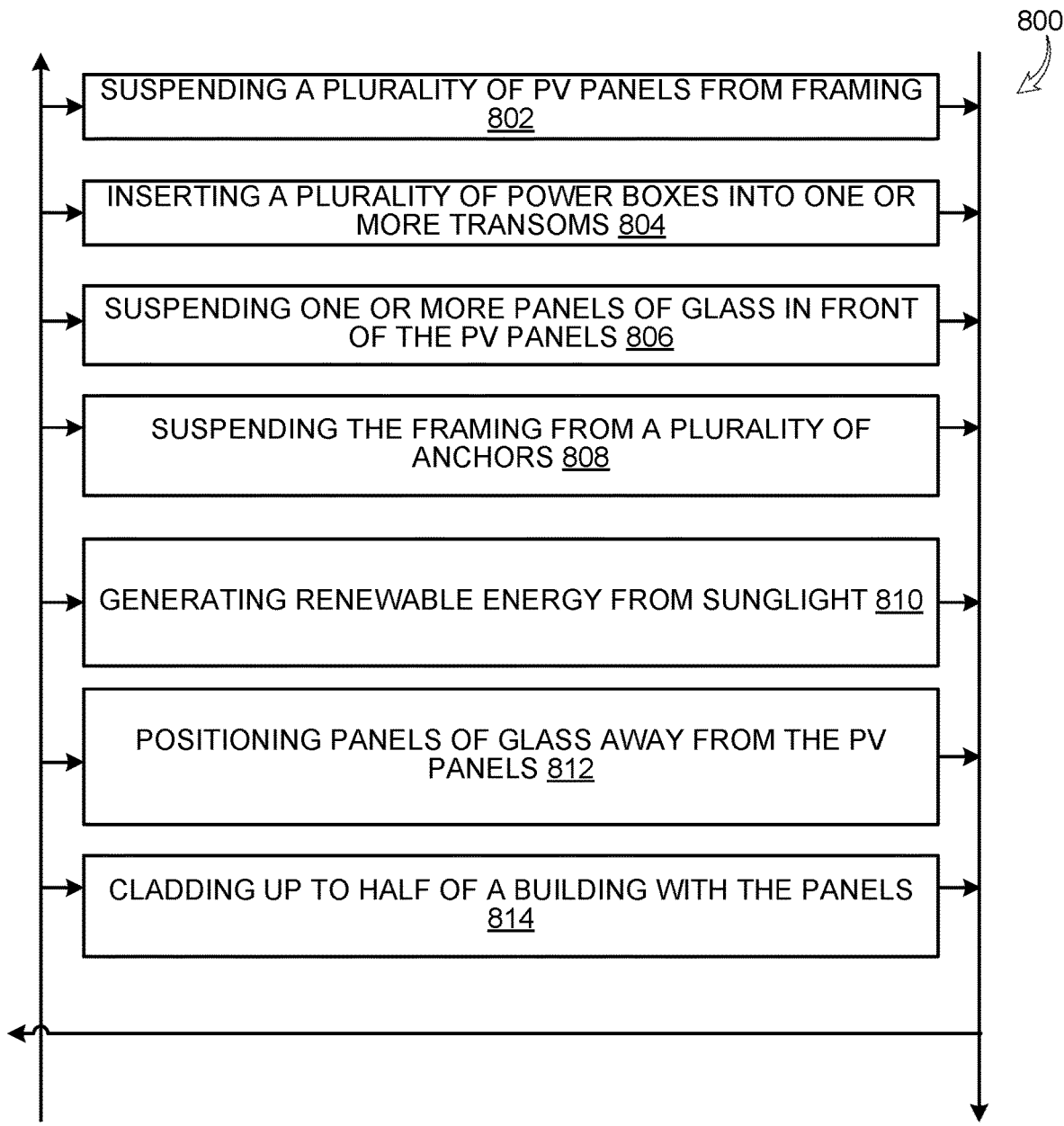
FIG. 8 illustrates a flow chart of the steps of a method in accordance with present invention.

FIG. 8 illustrates a flow chart of the steps of a method in accordance with present invention.

In various embodiments, a plurality of PV cells/frames may be suspending 802 from the mullions 116 and/or the transoms 118. The power boxes 104 may be positioned 804 or inserted into the hollow recesses defined by the transoms 118 and/or the mullions 116.

Glass 106 may be suspending 806 in front of the PV glass 102 from the framing 114. The framing 114 may be suspended 808 from anchors and renewable energy generated 810 from sunlight illuminating the building 902.

In various embodiments, the glass 102 is spaced away from the PV glass 106 by 1 to 20 mm.

In other embodiments, the plurality of transparent photovoltaic cells are interconnected using the window connections 110, which may be housed within fins 222 or behind the glass 106.

Specifications Generally

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

The invention claimed is:

1. A renewable energy generating cladding system comprising at least one renewable energy generating unit integrated with a building's exterior cladding, wherein the energy unit is connected to the building's electrical grid, comprising:
 a renewable energy generating unit;
 a cladding system, the cladding system comprising:
  a forward glass layer between 2 mm and 20 mm thick positioned in front of the renewable energy generating unit, wherein a recess is defined between the renewable energy generating unit and the forward glass layer of between 1 and 5 mm thick;
  a power box positioned behind the renewable energy generating unit;
 wiring interconnecting a plurality of renewable energy generating units, the wiring positioning within the recess.

2. The renewable energy generating cladding system of claim 1, wherein the renewable energy generating unit comprises at least one solar panel.

3. The renewable energy generating cladding system of claim 1, wherein a plurality of renewable energy generating units are connected in one of series and parallel.

4. The renewable energy generating cladding system of claim 1, wherein the renewable energy generating unit is integrated into the building's exterior cladding.

5. The renewable energy generating cladding system of claim 1, wherein the renewable energy generating unit is integrated into the building's façade by virtue of a mounting system comprising a embed pocket in a slab, mullion, transoms, and an anchor.

6. The renewable energy generating cladding system of claim 1, wherein the renewable energy generating unit is mounted on a frame attached to the building's exterior.

7. The renewable energy generating cladding system of claim 1, further comprising a monitoring system to track the amount of energy stored and discharged, wherein the monitoring system comprises sensors to measure energy generation and consumption, as well as optionally-executed algorithms to optimize the performance and efficiency of the renewable energy generating cladding system.

8. The renewable energy generating cladding system of claim 1, further comprising safety features of discharge transfer and overload surge protection.

9. The renewable energy generating cladding system of claim 1, wherein the renewable energy generating units are resistant to weather, environmental conditions, high shifting winds, hail and extreme temperatures.

10. The renewable energy generating cladding system of claim 1, wherein the renewable energy generating unit system is modular, and therefore interchangeable, replaceable, replicable and expandable.

11. The renewable energy generating cladding system of claim 1, further comprising an optional remote-control monitoring and communication system, said system optionally connected to a cloud-based platform that provides real-time data on energy generation, consumption, and performance of the system.

12. The renewable energy generating cladding system of claim 1, wherein the system provides a return on investment within a reasonable timeframe, therefore eligible for government incentives, rebates, energy credits and corollary financial benefits.

13. The renewable energy generating cladding system of claim 1, further comprising a fin positioning forward of the cladding system, the fin defining a hollow interior recess, wherein the fin comprises a power box and windows interconnection for connecting wiring from the plurality of transparent photovoltaic cells.

* * * * *